United States Patent

[11] 3,589,675

| [72] | Inventor | Domer Scaramucci<br>3245 S. Hattie, Oklahoma City, Okla. 73129 |
|---|---|---|
| [21] | Appl. No. | 875,332 |
| [22] | Filed | Nov. 10, 1969 |
| [45] | Patented | June 29, 1971<br>Continuation-in-part of application Ser. No. 763,644, Sept. 30, 1968, now Patent No. 3,531,081. |

[54] ROTARY VALVE ASSEMBLY WITH INSERTABLE VALVE UNIT
17 Claims, 11 Drawing Figs.
[52] U.S. Cl. .................................................. 251/151, 251/315, 251/306
[51] Int. Cl. .................................................. F16k 5/06
[50] Field of Search .................................................. 251/151, 148, 153, 315, 317, 306

[56] References Cited
UNITED STATES PATENTS

| 3,202,175 | 8/1965 | Dumm | 251/315 X |
| 3,118,465 | 1/1964 | Scaramucci | 137/454.2 |
| 3,244,398 | 4/1966 | Scaramucci | 251/148 |
| 3,370,612 | 2/1968 | Holl | 251/315 X |

Primary Examiner—M. Cary Nelson
Assistant Examiner—Michael O. Sturm
Attorney—Dunlap, Laney, Hessin & Dougherty

ABSTRACT: An improved valve assembly for use between flanges basically comprising a valve unit and a housing unit. The valve unit is sized to slidingly fit lengthwise into the housing unit, and includes a slot in a portion of the outer periphery thereof to accommodate the inner end of a valve stem mounted in the housing unit, such that the housing unit valve stem need not be moved lengthwise when the valve unit is being replaced. The housing unit is adapted to cooperate with the flanges to provide a circumferential, secondary metal-to-metal seal therebetween.

3,589,675

1

ROTARY VALVE ASSEMBLY WITH INSERTABLE VALVE UNIT

CROSS-REFERENCE TO RELATED APPLICATIONS

This application is a continuation-in-part of applicant's copending application entitled "Valve Assembly With Insertable Valve Unit," Ser. No. 763,644, filed Sept. 30, 1968, now U.S. Pat. No. 3,531,081.

BACKGROUND OF THE INVENTION

1. Field of the Invention

This invention relates to improvements in valves, and more particularly, but not by way of limitation, to an improved valve assembly having a separate valve unit which is installed lengthwise into a housing unit.

2. Description of the Prior Art

In applicant's copending application, referred to before, there was disclosed a valve assembly having a housing unit and a separate, insertable valve unit. The housing of the housing unit included a slot along a portion of the bore therethrough. The slot in the housing was sized to accommodate the interconnecting portions of the first and second valve stems, as the valve unit was slid lengthwise into the housing unit. The housing, therefore, did not contact the adjacent end faces of the flanges (between which the assembly is mounted) about an entire circumference. A circumferential sealing engagement between the housing and the flanges is desirable in some applications to provide a secondary metal-to-metal seal therebetween.

SUMMARY OF THE INVENTION

The present invention contemplates a valve assembly for controlling the flow of fluid between a pair of aligned pipe flanges interconnected by a plurality of circumferentially spaced bolts. The valve assembly basically comprises a housing unit and a valve unit. The housing unit includes a housing having opposite end faces and a bore extending therethrough. The housing is adapted to be supported between the flanges such that the end faces thereof cooperate with the adjacent end faces of the flanges to provide a circumferential metal-to-metal seal therebetween. A first valve stem having an upper and a lower end portion is supported in the housing, the lower end portion thereof extending into the bore of the housing. The valve unit is supported in the housing unit and includes a valve body having opposite ends and an outer periphery. The outer periphery is sized such that the body may be slid lengthwise into the housing. A valve chamber is formed in the valve body communicating with the opposite ends of the valve body. An elongated recess is formed in the valve body, intersecting one end thereof and a portion of the outer periphery thereof. The recess is sized and disposed to accommodate the lower end portion of the first valve stem as the valve unit is slid lengthwise into the housing unit. A valve member is supported in the valve chamber for opening and closing the valve assembly. A second valve stem is supported in the valve body having an upper and a lower end portion. The lower end portion is connected to the valve member and the upper end portion is adapted to interconnectingly fit the lower end portion of the first valve stem for transmitting the movement of the first valve stem to the valve member.

An object of the invention is to provide a valve assembly having an insertable valve unit wherein the housing is adapted to cooperate with the supporting flanges to provide a metal-to-metal seal therebetween.

Another object of the invention is to provide a valve assembly having a secondary metal-to-metal seal between the valve assembly and the supporting flanges and yet maintaining the amount of material used in the construction of the components in contact with the fluid flow to a minimum.

A further object of the invention is to provide a valve assembly which is economical in construction and operation.

2

Other objects and advantages of the invention will be evident from the following detailed description when read in conjunction with the accompanying drawings which illustrate various embodiments of the invention.

DESCRIPTION OF THE PREFERRED EMBODIMENTS

Figure 1:
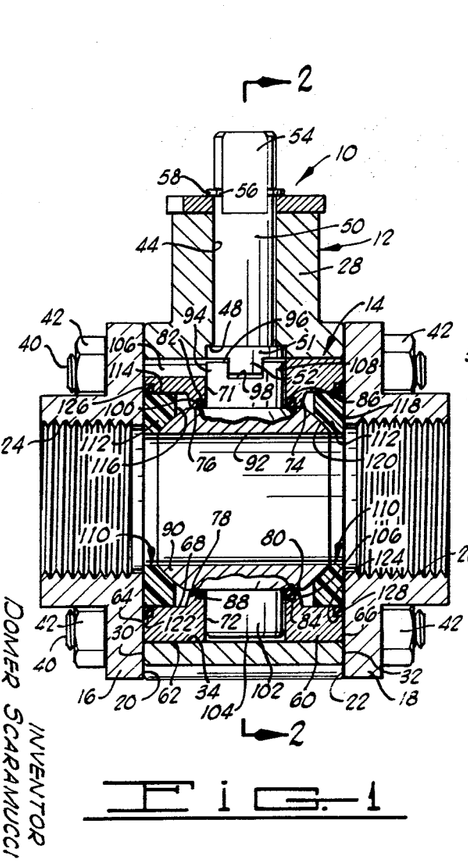
FIG. 1 is a sectional view of a valve assembly, assembled between two flanges.
Figure 2:
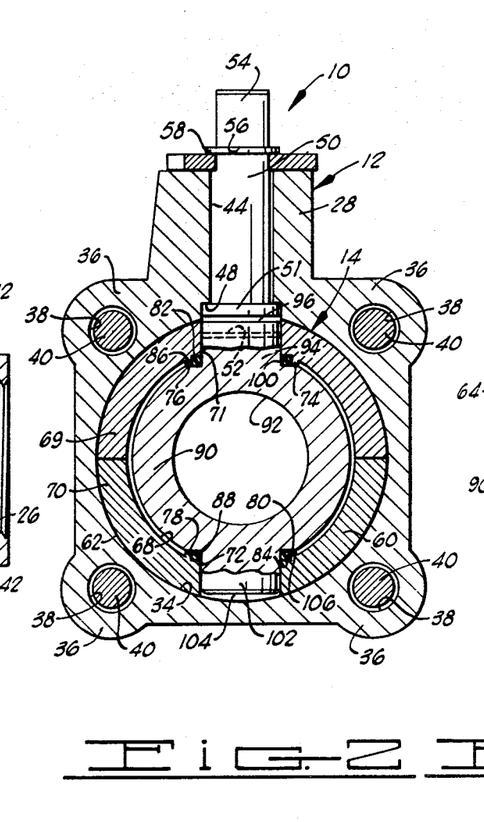
FIG. 2 is a sectional view of the valve assembly of FIG. 1, taken substantially along the lines 2-2 of FIG. 1.

Referring to the drawings in detail, and to FIGS. 1 and 2 in particular, reference character 10 generally designates a valve assembly basically comprising a housing unit 12 and a valve unit 14. The valve assembly 10 is disposed generally between flanges 16 and 18. Each of the flanges 16 and 18 includes an end face 20 or 22, an opening 24 or 26, respectively. The openings 24 and 26 are axially aligned and sized to receive the ends of adjacent sections of a conduit (not shown).

The housing unit 12 includes a tubular housing 28 having opposite end faces 30 and 32, and a bore 34 extending therethrough. A flange portion 36 is formed on the outer periphery of the housing 28 and, as shown more clearly in FIG. 2, four circumferentially spaced holes 38 are provided therethrough.

The housing unit 12, the valve unit 14 and the flanges 16 and 18 are held in assembled relationship by a plurality of circumferentially spaced bolts 40 that extend through the flanges 16 and 18, and through the holes 38 in the housing 28. Each of the bolts 40 is provided with a pair of threaded nuts 42 that engage the flanges 16 and 18.

An aperture 44 extends transversely through the housing 28 intersecting the bore 34. The aperture 44 is provided with a counterbore adjacent its intersection with the bore 34, thereby providing a downwardly facing planar surface 48 in the housing 28.

A first valve stem 50 is journaled in the housing 28 and extends through the aperture 44. Thus, the centerline of the first valve stem 50 extends at a right angle to the centerline of the bore 34 in the housing 28. The first valve stem 50 includes a lower flange portion 51 that engages the downwardly facing surface 48 in the housing 28 to limit the upward movement of the first valve stem 50 in the aperture 44, and to provide a secondary type metal-to-metal seal therebetween. The lowermost end portion 52 of the first valve stem 50 is rectangularly shaped, and is sized to interconnectingly fit a portion of a second valve stem, as will be described in more detail below.

An upper portion 54 of the first valve stem 50 is adapted to receive and cooperate with a valve handle or other suitable operator (not shown), for turning the first valve stem 50 of the housing unit 12 and thereby rotating a valve member from a fully open to a fully closed position, as will be described in more detail below. As well known in the art, various forms of valve handles and operators may be used and therefore no further description is required herein.

A groove 56 is formed in the upper portion 54 of the first valve stem 50, and a retaining ring 58 is disposed in the groove 56. The retaining ring 58 is sized and disposed to engage a portion of the housing 28 to limit the downward movement of the first valve stem 50 in the aperture 44.

The valve unit 14 includes a valve body 60 having an outer periphery 62 sized to slidingly fit lengthwise into the bore 34 of the housing 28, and having opposite end faces 64 and 66. A bore 68 extends through the valve body 60 intersecting the end faces 64 and 66 to form the valve chamber of the valve assembly 10.

As split more clearly in FIG. 2, the valve body 60 is split along the horizontal centerline thereof, thereby providing an upper body component 69 and a lower body component 70. The valve body 60 is split in this manner to facilitate the assembly of the valve body 60 about the valve ball, as will be described in more detail below.

An upper aperture 71 extends transversely through the valve body 60 intersecting the bore 68 therein. A lower aperture 72 extends transversely through the valve body 60 and also intersects the bore 68. In a preferred form the upper and lower apertures 71 and 72 are aligned. A raised portion 74 is formed on the valve body 60, generally surrounding the upper aperture 71 and extends a distance radially into the bore 68 of the valve body 60, terminating with a lower most end 76. A second raised portion 78 is formed on the valve body 60 generally surrounding the lower aperture 72, and extending a distance radially into the bore therein, terminating with an uppermost end 80. A recess 82 is formed in the end 76 of the raised portion 74, encircling and intersecting the upper aperture 71. A second recess 84 is formed in the end 80 of the second raised portion 78, encircling and intersecting the lower aperture 72. An O-ring seal member 86 is disposed in the recess 82 and an O-ring seal member 88 is disposed in the recess 84, for reasons which will be made more apparent below.

A valve ball member 90 is disposed in the bore 68 of the valve body 60. The valve ball 90 has a port 92 extending therethrough. When the valve ball 90 is in the open position, as shown in FIGS. 1 and 2, the port 92 is axially aligned with the openings 24 and 26 of the flanges 16 and 18, respectively.

A second valve stem 94 extends upwardly from the valve ball 90, through the upper aperture 71 of the valve body 60 and is journaled therein. In the preferred form and as shown in FIGS. 1 and 2, the second valve stem 94 is formed integrally with the valve ball 90. The second valve stem 94 extends upwardly from the valve ball 90 and terminates with an upper end 96. A recess 98 is formed in the upper end 96 of the second valve stem 94 and is shaped to interconnectingly receive the rectangularly shaped end 52 of the first valve stem 50 when the valve assembly 10 is in the assembled position.

As shown in FIGS. 1 and 2, a portion 100 of the exterior surface of the valve ball 90, generally adjacent the second valve stem 94, is substantially flat, and sized to journally engage the lower end 76 of the raised portion 74. The O-ring 86 in the recess 82 is sized to sealingly engage a portion of the flat portion 100 of the valve ball 90, the adjacent portion of the valve body 60 and a portion of the second valve stem 94, thereby forming a fluidtight seal therebetween.

A third valve stem 102 extends downwardly from the valve ball 90 through the aperture 72 of the valve body 60, terminating with a lower end 104. The third valve stem 102 is sized such that a portion thereof is journaled in the aperture 72 of the valve body 60 and, in a preferred form, the third valve stem 102 is formed integrally with the valve ball 90.

A portion 106 of the exterior surface of the valve ball 90, generally adjacent the third valve stem 102, is substantially flat and sized to journally engage the upper end 80 of the raised portion 78. The O-ring 88 in the recess 84 is sized to sealingly engage a portion of the flat portion 106 of the valve ball 90, the adjacent portion of the valve body 60 and a portion of the third valve stem 102, thereby forming a fluidtight seal therebetween. The third valve stem 102 is sized and supported in the valve body 60 such that, in the assembled position, the lowermost end 104 of the third valve stem 102 will not contact the valve body 60.

Figure 3:
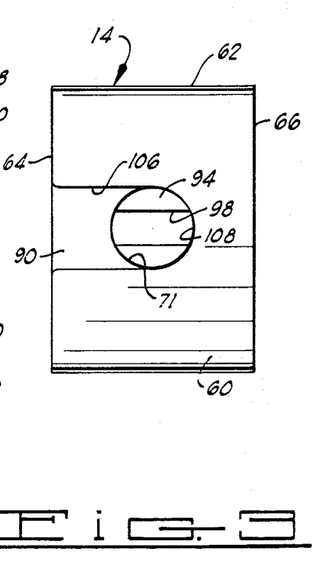
FIG. 3 is a top elevational view of the valve unit of FIG. 1, shown removed from the housing unit.

As shown more clearly in FIG. 3, an elongated recess 106 is formed in an upper portion of the valve body 60, intersecting the end face 64 thereof. One end portion 108 of the recess 106 is shaped to journally encompass a portion of the second valve stem 94. The second valve stem 94 is sized such that the upper end 96 thereof does not extend beyond the outer periphery 62 of the valve body 60. The recess 106 is sized to accommodate the rectangular end 52 of the first valve stem 50 as the valve unit 14 is slid lengthwise into the housing unit 12, as will be described in more detail below.

A seat assembly 110 is disposed in each end of the valve body 60. In a preferred form, the seat assemblies 110 are similar, and each seat assembly 110 is constructed of elastomeric-type material. Each seat assembly 110 includes a seat ring 112 having an outer periphery 114, a valve member end 116 and a nonvalve member end 118. The outer periphery 114 of each seat ring 112 is sized to slidingly fit in one end of the valve body 60, and each seat ring 112 is adapted such that it may be inserted axially into the valve body 60.

A seating surface 120 is formed on a portion of the valve member end 116 of each seat ring 112. Each seat ring 112 is sized such that in an assembled position, as shown in FIGS. 1 and 2, the seating surface 120 will engage one end portion of the valve member 90. In the assembled position, the nonvalve member end 118 of one of the seat rings 112 is sized to engage the end face 20 of the flange 16, and the end face 118 of the other seat ring 112 is sized to engage the end face 22 of the flange 18. It is apparent from the foregoing that the flanges 16 and 18 cooperate with the valve body 60 to secure the seat assemblies 110 in an assembled position.

A counterbore 122 is formed in the end face 64 of the valve body 60 encircling and intersecting the bore 68 therethrough. A second counterbore 124 is formed in the end face 66 of the valve body 60 intersecting and encircling the bore 68 therethrough. An O-ring member 126 is disposed in the counterbore 122 and an O-ring seal member 128 is disposed in the counterbore 124. The O-ring 126 is sized to sealingly engage the end face 20 of the flange 16, the outer periphery 114 of the adjacent seat ring 112 and the adjacent portion of the valve body 60, thereby forming a fluidtight seal therebetween. The O-ring 128 is sized to sealingly engage the end face 22 of the flange 16, the outer periphery 114 of the adjacent seat ring 112 and the adjacent portions of the valve body 60, thereby forming a fluidtight seat therebetween.

OPERATION OF FIGS. 1, 2 AND 3

As previously mentioned, the valve assembly 10 basically comprises two units; the housing unit 12 and the valve unit 14. The valve unit 14 is sized to slide lengthwise into the bore 34 of the housing 28, the outer periphery 62 of the valve body 60 being sized to slidingly fit into the bore 34 of the housing 28.

The valve unit 14 is constructed as a separate component of the valve assembly 10 by placing the upper body component 69 above the valve ball 90 such that the second valve stem 94 extends through the upper aperture 71. The lower body component 70 is then placed about the valve ball 90 such that the third valve stem 102 extends through the lower aperture 72.

After the first valve stem 50 has been placed in the assembled position, as shown in FIGS. 1 and 2, the valve unit 14 is slid into the housing unit 12. The valve unit 14 is slid into the housing unit 12 such that the end 64 of the valve body 60 is initially inserted into the bore 34 of the housing 28. In this manner, the rectangular end 52 of the first valve stem 50 will, relatively speaking, travel in the area provided by the slot 106 in the valve body 12 to a position where the rectangular end 52 is interconnectingly disposed in the recess 98 of the second valve stem 94.

The seat assemblies 110 are then inserted axially into the bore 68 of the valve body 60, and the flanges 16 and 18 are secured about the valve assembly 10.

The turning movement of the valve handle is transmitted to the valve ball 90 via the interconnection between the first valve stem 50 and the second valve stem 94. The valve ball 90 may thus be rotated from an open position, as shown in FIG. 1, to a closed position (not shown).

As the valve ball 90 is rotated, the third valve stem 102 will rotate, following the rotational movement of the valve ball 90. Since the third valve stem 102 does not contact the housing 28, the resistance to the turning movement of the valve ball 90 is correspondingly reduced. It should also be noted that this particular construction, virtually eliminates the possibility of foreign particles becoming lodged between the third valve stem 102 and the housing 28, or excessive corrosion therebetween, resulting in the possibility of a binding engagement.

The seat assemblies 110 provide upstream and downstream sealing integrity about the valve ball 90, the seating surface 120 of each seat assembly seatingly and sealingly engaging the adjacent portion of the valve ball 90. It is apparent from the foregoing and from FIG. 1, that the seat assemblies 110 are adapted such that the flow could be in either direction through the valve assembly 10.

In the event some fluid leaks past the seat assemblies 110, the O-rings 86 and 88 provide a fluid seal about the second and third valve stems 94 and 102, respectively, thereby reducing the possibility of fluid leaking between the valve stems 94 and 102 and the valve body 60, and eventually contacting the housing 28. The O-rings 126 and 128 provide the sealing integrity between the valve body 60 and the flanges 16 and 18, respectively.

It is apparent from the foregoing, that the housing 28 will not be in contact with any substantial portion of the fluid flowing through the valve assembly 10. The housing 28 may therefore be constructed of any material, such as cast iron or cast steel, the main considerations being the strength and economical considerations of the valve assembly 10.

The housing 28 may, therefore, be constructed to provide the strength characteristics of the valve assembly 10, and the material used in the construction of the valve body 60 may be kept to a minimum. This feature is particularly important in those applications where the fluid being handled dictates that the portions of the valve assembly contacting the fluid flowing therethrough be constructed of an expensive or exotic type of material.

Should repair or replacement of the valve unit 14 become necessary, the valve unit is simply slipped out of the housing unit 12, and a new valve unit is inserted, thereby facilitating replacement and repair of the valve assembly in the field. This procedure requires less downtime during the field repair of the valve assembly.

Since one of the advantages of the valve assembly 10 is that the amount of material used in the construction of the valve unit 14 may be reduced to a minimum, it is apparent that the contact area between the end faces 64 and 66 of the valve body 60 and the adjacent end faces 20 or 22 of the flanges 16 or 18 will also be minimal. Therefore in most applications, the contacting area between the valve body 60 and the flanges 16 and 18 is not sufficient to provide an adequate metal-to-metal seal therebetween. It should also be noted that in some applications, the valve body 60 may be constructed of a material, the characteristics of which are not suitable to provide a metal-to-metal type of sealing contact with the flanges 16 and 18. It is apparent from the foregoing that there exist many advantages in constructing the housing 28 to provide the metal-to-metal sealing engagement with the flanges 16 and 18.

As mentioned before, the recess 106 in the valve body 60 accommodates the lower end portion 52 of the first valve stem 50 during the insertion of the valve unit 14 in the housing unit 12. The construction of the valve assembly 10 in this manner eliminates the necessity of having to form a slot in the housing 28. Thus, the end faces 30 and 32 of the housing 28 engage the respective end face 20 or 22 of the flanges 16 or 18 about an entire circumference of the housing 28. This circumferential engagement between the housing 28 and the flanges 16 and 18 provides a secondary metal-to-metal seal, protecting the valve assembly 10 in the event the primary seals are destroyed, as by fire.

It should also be noted that in some instances it is more economical from a manufacturing point of view to provide the accommodation for the lower end portion of the first valve stem 50, rather than having a slot formed in the housing 28. This construction also permits the accommodation for the metal-to-metal sealing feature of the flange 51 on the first valve stem 50 to be formed in the housing 28 in a more economical manner.

Figure 4:
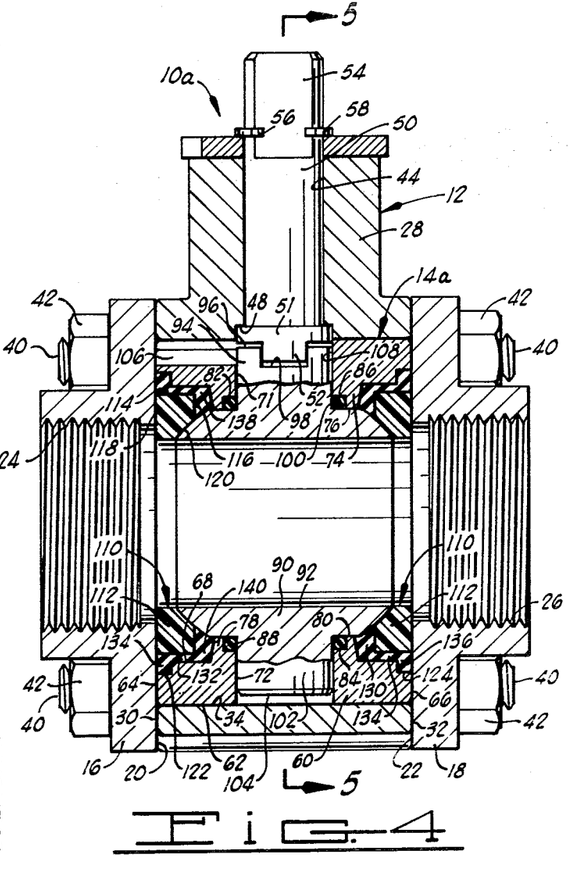
FIG. 4 is a sectional view of a modified valve assembly.
Figure 5:
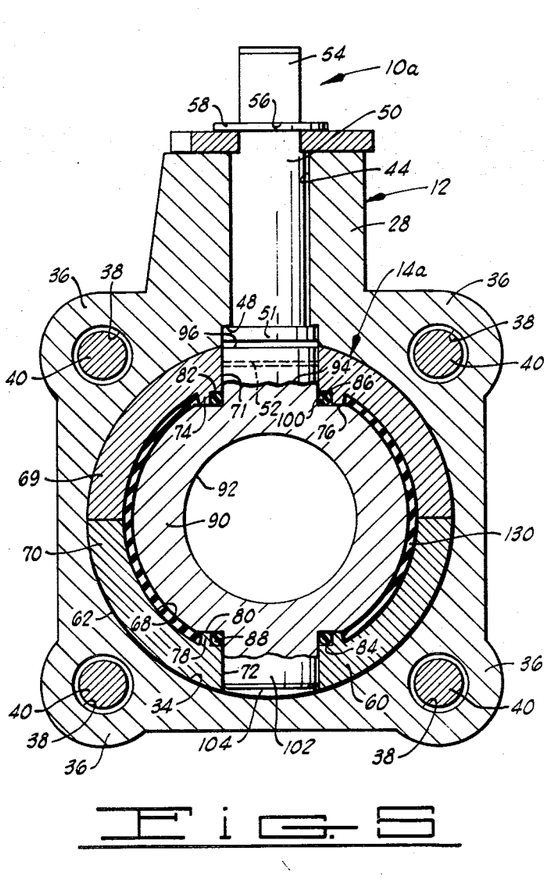
FIG. 5 is a sectional view of the valve assembly of FIG. 4, taken substantially along the lines 5-5 of FIG. 4.

EMBODIMENTS OF FIGS. 4 AND 5

The valve assembly 10a, shown in FIGS. 4 and 5, is constructed similar to the valve assembly 10, described before. One salient difference being that the valve assembly 10a includes a composite liner 130.

In a preferred form the upper and the lower body components 69 and 70, respectively, are assembled about the valve ball 90, and the composite liner 130 is formed in the bore 68 of the valve body 60. In this form, the portions of the valve ball 90 which are in contact with the composite liner 130 are treated so that the composite liner 130 will not be bonded thereto. The composite liner 130, in a preferred form is constructed of an elastomeric material.

As shown more clearly in FIG. 4, a portion 132 of the composite liner 130 is bonded to and encircles the wall in the valve body 60 formed by the bore 68 therein. A portion 134 of the composite liner 130 extends into and is bonded to the wall formed by the counterbore 122 in the valve body 60 and another portion 136 extends into and is bonded to the wall formed by the counterbore 124 in the valve body 60. The opposite ends of the composite liner 130 generally adjacent the portions 134 and 136 are, in a preferred form, sized to extend beyond the respective end face 64 or 66 of the valve body 60. Thus, as the flanges 16 and 18 are assembled about the valve assembly 10, the end faces 20 or 22 will sealingly and compressingly engage the respective end faces of the composite liner, thereby forming a fluidtight seal therebetween.

A portion 138 of the composite liner 130 is bonded to the outer wall formed by the raised portion 74 in the valve body 60. The portion 138 is sized to extend beyond the lower end 76 of the raised portion 74 and to sealingly engage the adjacent portion of the valve ball 90. Another portion 140 of the composite liner 130 is bonded to the outer wall formed by the raised portion 78 in the valve body 60. The portion 140 is sized to extend beyond the upper end 80 of the raised portion 78 and to sealingly engage the adjacent portion of the valve ball 90.

The composite liner 130 is sized and shaped to receive the seat assemblies 110 and to sealingly engage the outer periphery 114 of each seat ring 112.

OPERATION OF FIGS. 4 AND 5

The valve assembly 10a will operate similar to the valve assembly 10 described before. The salient difference being that the valve assembly 10a includes the composite liner 130.

The liner 130 provides the sealing engagement between the valve body 60 and the flanges 16 and 18; and provides a secondary type sealing engagement about the valve ball 90. The liner 130, therefore, augments the sealing effectiveness of the seat assemblies 110 and the stem seals 86 and 88.

It is apparent from the foregoing that the valve assembly 10a retains all of the advantages of the valve assembly 10, and in addition provides a molded-in-place type of composite liner 130.

Figure 6:
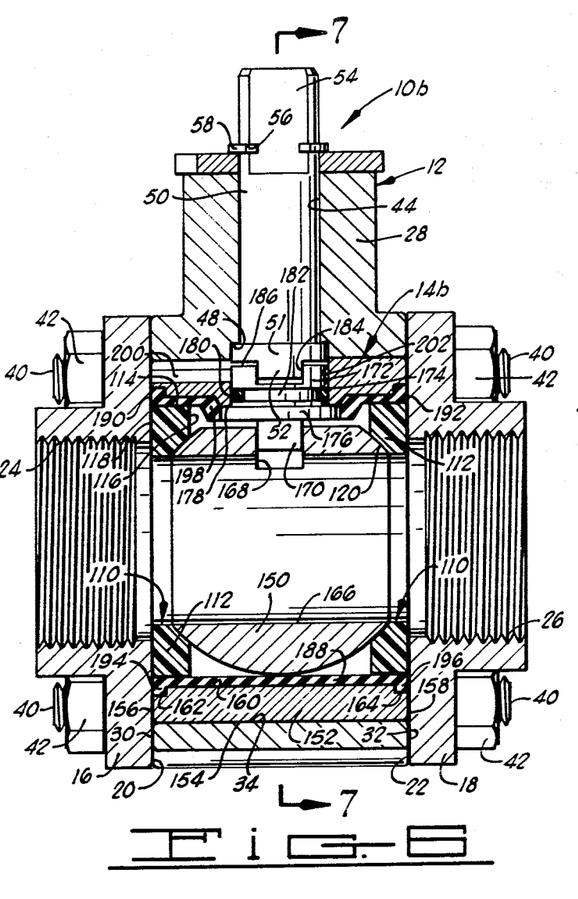
FIG. 6 is a sectional view of another modified valve assembly.
Figure 7:
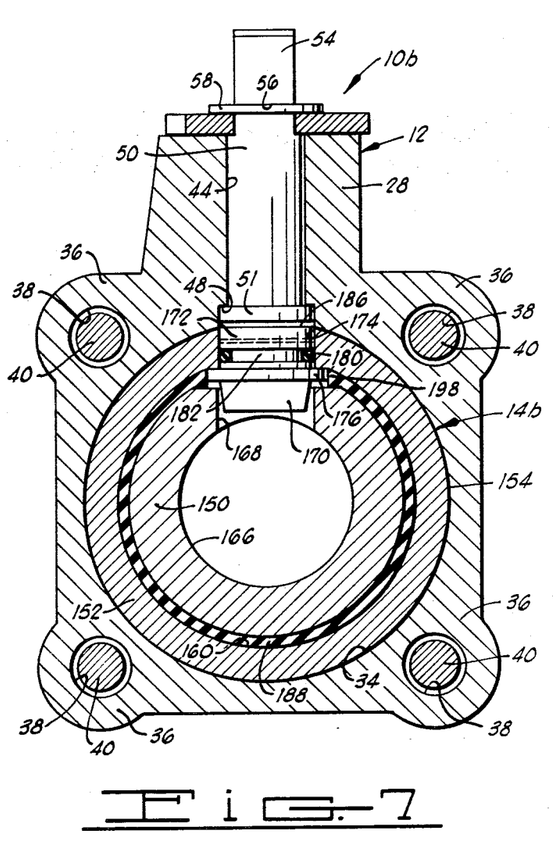
FIG. 7 is a sectional view of the valve assembly of FIG. 6, taken substantially along the lines 7-7 of FIG. 6.

EMBODIMENT OF FIGS. 6 AND 7

The valve assembly 10b is constructed similar to the valve assemblies 10 and 10a described before. One salient difference being that the valve unit 14b of the valve assembly 10b is adapted to cooperate with a floating type valve ball 150, in a manner to be described below.

The valve unit 14b includes a valve body 152 having an outer periphery 154 sized to slidingly fit into the bore 34 of the housing 28, and having opposite end faces 156 and 158, a bore 160 extends through the valve body 152, intersecting the end faces 156 and 158 to form a valve chamber in the valve body 152. A pair of counterbores 162 and 164 are formed in the valve body 152 adjacent the end faces 156 and 158, respectively.

The valve ball 150 is movably disposed in the bore 160 of the valve body 152 and has a flow port 166 extending therethrough. When the valve ball 150 is in the open position, as shown in FIGS. 6 and 7, the port 166 is axially aligned with the threaded openings 24 and 26 of the flanges 16 and 18, respectively.

The valve ball 150 has a rectangular recess 168 formed in the exterior surface thereof. The recess 168 is sized to receive a rectangular end 170 formed on the lower most end portion of a second valve stem 172. The recess 168 of the valve ball 150 is longer in one direction than the end 170 of the second valve stem 172 to permit movement of the valve ball 150 in direction parallel to the bore 160 of the valve body 152 when the valve ball 150 is turned to the closed position. The valve ball 150 is, therefore, of the type generally known in the art as a "floating valve member."

An aperture 174 extends transversely through the valve body 152 intersecting the bore 160 therein. The second valve stem 172 is journally disposed in the aperture 174. In addition to the rectangular end 170, the second valve stem 172 includes an exterior flange 176 that engages a downwardly facing surface 178 encircling the aperture 174 in the valve body 152. An O-ring seal 180 is disposed in an annular groove 182 formed in the second valve stem 172, and is arranged to provide a fluidtight seal between the valve body 152 and the second valve stem 172.

A recess 184 is formed in a portion of an uppermost end 186 of the second valve stem 172. The recess 184 is sized to matingly and interconnectingly receive the rectangularly shaped end 52 of the first valve stem 50, and thereby transmit the turning movement of the first valve stem 50 to the valve ball 150.

A composite liner 188 is formed in the bore 160 of the valve body 152. The composite liner 188, in a preferred form is constructed of an elastomeric-type material, and is bonded to the valve body 152. The liner 188 has opposite ends 190 and 192. The ends 190 and 192 are sized to extend a distance axially beyond the adjacent end 156 or 158 of the valve body 152 so that, in the assembled position, the flanges 16 or 18 compressingly and sealingly engage the ends 190 or 192, respectively, to provide a fluidtight seal therebetween.

A portion 194 of the liner 188, generally adjacent the end 190 thereof, extends into the counterbore 162 and is bonded to the walls thereof. Another portion 196 of the liner 188 generally adjacent the end 192 thereof, extends into the counterbore 164 and is bonded to the walls thereof.

In a preferred from, the liner 188 is molded in the valve body 152 with the second valve stem 172 in place. A portion 198 of the liner 188 sealingly engages a portion of the flange portion 176 of the second valve stem 172 about the outer periphery thereof. The portion 198 therefore establishes a primary seal between the valve body 152 and the second valve stem 172, the O-ring 180, in this instance providing a secondary seal therebetween. It is also apparent from the foregoing that the flange portion 176 will engage the downwardly facing surface 178 in the valve body 152 and thereby provide a metal-to-metal seal therebetween, in the event the primary and the secondary seals are destroyed by fire.

The inner periphery of the liner 188 is sized to slidingly and sealingly receive the seat assemblies 110. In a preferred form, the diameter of the inner periphery of the liner 188 is slightly smaller than the outer periphery 114 of each seat assembly 110 so the liner 188 will sealingly engage each seat ring 112 about the outer periphery 114 thereof.

An elongated recess 200 is formed in an upper portion of the valve body 152, intersecting the end face 156 thereof. One end portion 202 of the recess 200 is shaped to journally encompass a portion of the second valve stem 172. The second valve stem 172 is sized such that the upper end 186 thereof does not extend beyond the outer periphery of the valve body 152. The recess 200 is sized to accommodate the rectangular end 52 of the first valve stem 50, as the valve unit 14b is slid lengthwise into the housing unit 12, in much the same manner as the recess 106 of the valve assembly 10.

OPERATION OF FIGS. 6 AND 7

The valve assembly 10b will operate similar to the valve assemblies 10 and 10a described before. The salient difference being that the valve ball 150 of the valve assembly 10b is not journaled in the valve body 152, but rather is a floating type valve member.

Since the rectangular end 170 of the second valve stem 184 is slightly smaller in one direction than the recess 168 in the surface of the valve ball 150, the valve ball 150 will be free to move a distance upstream or downstream when the valve ball 150 is rotated to the closed position. Assuming a pressure exists in the inlet end of the valve, a pressure differential will be applied across the valve ball 150, and the valve ball 150 will be moved downstream to engage the downstream seat 110. When the valve ball, 150 seats against the downstream seat assembly 110, the seating surface 120 thereof will sealingly engage the adjacent portion of the exterior surface of the valve ball 150. It is apparent that the flow could be in either direction through the valve assembly 10b.

It is apparent from the foregoing that the valve assembly 10b retains most of the advantages of the valve assemblies described before, but it is adapted to cooperate with a floating valve member which may be more desirable in some applications.

Figure 8:
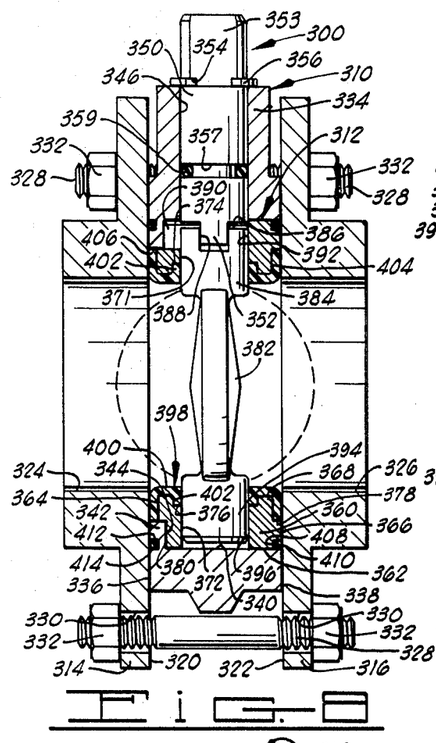
FIG. 8 is a sectional view of another valve assembly.
Figure 9:
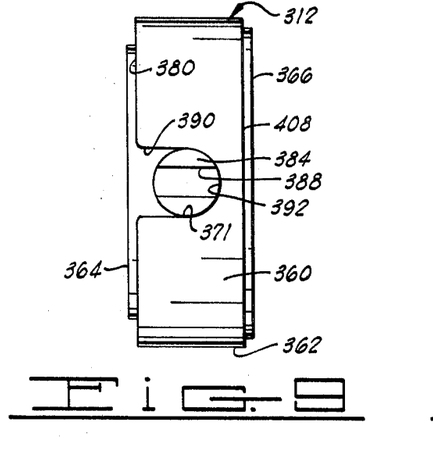
FIG. 9 is a top elevational view of the valve unit of the valve assembly of FIG. 8, shown removed from the housing unit.

EMBODIMENTS OF FIGS. 8 AND 9

Shown in FIGS. 8 and 9 is a valve assembly 300 basically comprising a housing unit 310 and a valve unit 312. The valve assembly 300 is disposed between flanges 314 and 316. Each of the flanges 314 and 316 includes an end face 320 or 322, and an opening 324 or 326, respectively. The openings 324 and 326 are axially aligned and sized to receive the ends of adjacent sections of a conduit (not shown).

The housing unit 310, the valve unit 312 and the flanges 314 and 316 are held together in an assembled position by a plurality of circumferentially spaced bolts 328. The bolts 328 extend through apertures 330 in the flanges 314 and 316, and about the outer periphery of the housing unit 310. Each bolt 328 is provided with a pair of nuts 332 that engage the flanges 314 and 316.

The housing unit 310 includes a housing 334 having opposite end faces 336 and 338, and a bore 340 extending therethrough. A radially inwardly extending rim 342 is formed about a portion of the bore 340 of the housing 334, thereby forming a wall 344 encircling the bore 340. An aperture 346 extends transversely through the housing 334, intersecting the bore 340.

A first valve stem 350 is journaled in the housing 334 and extends through the aperture 346 therein. Thus, the centerline of the first valve stem 350 extends at a right angle to the centerline of the bore 340 in the housing 334. The first valve stem 350 is sized such that it can be inserted downwardly through the aperture 346 and is, therefore of the type generally known in the art a "drop-type" stem. The lower most end portion 352 of the first valve stem 350 is rectangularly shaped, and is sized to interconnectingly fit a portion of a second valve stem, as will be described in more detail below.

An upper portion 353 of the first valve stem 350 is adapted to receive and cooperate with a valve handle or other suitable operator for turning the first valve stem 350, thereby rotating a valve member from a fully open to a fully closed position, as will be described below. A groove 354 is formed in the upper portion 353 of the first valve stem 350, and a retaining ring 356 is disposed in the groove 354. The retaining ring 356 is sized and disposed to engage a portion of the housing 334 to limit the downward movement of the first valve stem 350 in the aperture 346.

A groove 357 is formed in the first valve stem 350 generally between the upper most end 353 and the lower most end 352, and an O-ring 359 is disposed in the groove 357. The O-ring 359 is sized to sealingly engage the housing 334, thereby forming a fluid seal between the housing 334 and the first valve stem 350.

The valve unit 312 includes a valve body 360 having an outer periphery 362 which is sized to slidingly fit lengthwise into the bore 340 of the housing 334, and opposite end faces 364 and 366. A bore 368 extends through the valve body 360, intersecting the end faces 364 and 366, to form the valve chamber of the valve assembly 10.

An upper aperture 371 extends transversely through the valve body 360, intersecting the bore 368. A lower aperture 372 extends transversely through the valve body 360 and also intersects the bore 368. In a preferred form, the upper and lower apertures 371 and 372 are aligned.

A recess 374 is formed in the inner periphery of the valve body 360, generally surrounding and intersecting the upper aperture 371, and a recess 376 is formed in the inner periphery of the valve body 360, generally surrounding and intersecting the lower aperture 372.

A counterbore 378 is formed in the end 366 of the valve body 360, and a recess 380 is formed in the end 364 of the valve body 360 intersecting the outer periphery 362 thereof. The recess 380 is sized to cooperate with the rim 342 in the housing 334 to limit the inward axial movement of the valve body 360, as the valve unit 312 is slid lengthwise into the housing 334. In the assembled position, as shown in FIG. 8, the wall 344 abuts the wall formed by the recess 380 to limit the inward movement of the valve unit 312 and to position the valve unit 312 in the housing unit 310. The axial length of the valve body 360 is sized such that, in the assembled position, the end 364 of the valve body 360 does not abut the end face 320 of the flange 314, but rather a gap exists therebetween.

A disc valve member 382 is rotatably disposed in the bore 368 of the valve body 360. A second valve stem 384 extends upwardly from the disc valve member 382 through the upper aperture 371 of the valve body 360, terminating with an upper most end 386. A recess 388 is formed in the upper end 386 of the second valve stem 384 and is shaped to interconnectingly receive the rectangularly shaped end 352 of the first valve stem 350.

As shown more clearly in FIG. 9, an elongated recess 390 is formed in an upper portion of the valve body 360, intersecting the end face 364 thereof and a portion of the outer periphery 362 thereof. One end portion 392 of the recess 340 is shaped to journally encompass an adjacent portion of the second valve stem 384. The second valve stem 384 is sized such that the upper end 386 thereof does not extend beyond the outer periphery 362 of the valve body 360. The recess 390 is sized to accommodate the rectangular end 352 of the first valve stem 350, as the valve unit 312 is slid lengthwise into the housing unit 310.

A third valve stem 394 extends downwardly from the disc 382 through the lower aperture 372 of the valve body 360, terminating with a lower end 396. The third valve stem 394 is sized such that a portion thereof is journaled in the lower aperture 372 and, in a preferred form, the third valve stem 394 is formed integrally with the disc 382.

In a preferred form, the valve body 360 is split into two separate components along a horizontal centerline, thereof, similar to the valve body 60 shown in FIGS. 1, 2 and 3, to facilitate the assembly of the valve body 360 about the disc 382 with the second and the third valve stems 384 and 394 connected thereto.

A composite seat 398 is formed in the valve body 360. In a preferred form, the valve body 360 is assembled about the disc 382 having the second and third valve stems 384 and 394 connected thereto, and the composite seat 398 is then molded-in-place in the valve body 360. As shown in FIG. 8, the composite seat 398 has an inner periphery 400. A central portion of the inner periphery 400 is sized to sealingly engage the disc valve member 382 about the outer periphery thereof, when the disc 382 has been rotated to the closed position. A portion 402 of the composite seat 398 is formed in the recesses 374 and 376 of the valve body 360, and sized to engage the adjacent portions of the second or third valve stems 384 or 394, respectively. Another portion 404 of the composite seat 398 is formed in the counterbore 378, and a portion 406 is formed about the end 364 of the valve body 360. The portions 404 and 406 are each sized to sealingly engage one of the end faces 320 or 322 of the flanges 314 or 316, when the valve 300 is in the assembled position, as shown in FIG. 8.

A recess 408 is formed in the end face 366 of the valve body 360, intersecting the outer periphery 362 thereof. An O-ring 410 is disposed in the recess 408, and is sized to sealingly engage the adjacent portion of the valve body 360, a portion of the bore 340 of the housing 334 and a portion of the end face 322 of the flange 316, thereby forming a fluidtight seal therebetween.

A recess 412 is formed in the end face 336 of the housing 334 and an O-ring 414 is disposed in the recess 412. The O-ring 414 is sized to sealingly engage the adjacent portion of the housing 334, and a portion of the end face 320 of the flange 314, thereby forming a fluidtight seal therebetween.

OPERATION OF FIGS. 8 AND 9

Since the first valve stem 350 is of a "drop-type" stem construction, the valve unit 312 may be inserted lengthwise into the housing unit 310 either before or after the first valve stem 350 has been inserted into the housing 334. This particular construction is desirable in those applications where it may become necessary to remove the first valve stem 350 and the valve operator connected thereto, after the valve assembly 300 has been placed in an assembled position. In other words, the first valve stem 350 can be removed without first having to remove the valve unit 314.

The elongated recess 390 in the valve body 360 is sized to accommodate the lower end 352 of the first valve stem 350, as the valve unit 310 is inserted in the housing unit 312. Therefore, as shown in FIG. 8, the end faces 336 and 338 of the housing 334 engage the respective end face 320 or 322 of the flanges 314 or 316 about an entire circumference of the housing 334. This circumferential engagement between the housing 334 and the flanges 314 and 316 provides a secondary metal-to-metal seal, protecting the valve assembly 300 in the event the primary seals are destroyed by fire.

The composite seat 398 provides the primary sealing engagement about the second and third valve stems 384 and 394 and between the valve body 360 and the flanges 314 and 316. The O-ring 359 provides a stem seal about the first valve stem 350 should any fluid leak past the primary seals in the valve body 360. The O-rings 410 and 414 provide secondary seals between the housing 334 and the flanges 314 and 316, and the O-ring 410 also forms a fluid seal between the valve body 360 and the housing 334.

It is apparent from the foregoing that the valve assembly 300 retains most of the advantages of the valve assemblies described before, but shows a construction adapted to receive and cooperate with a disc-type valve member.

Figure 10:
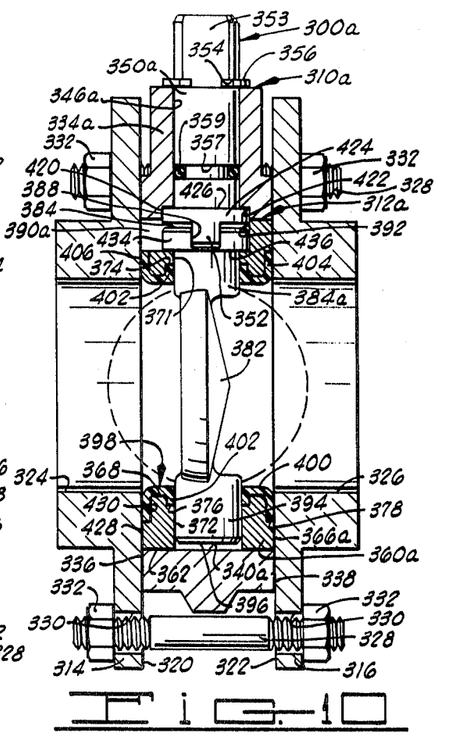
FIG. 10 is a sectional view of still another valve assembly.
Figure 11:
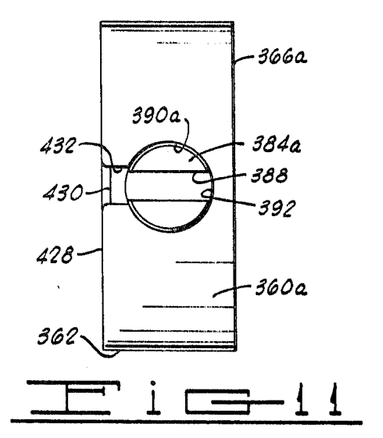
FIG. 11 is a top elevational view of the valve unit of the valve assembly of FIG. 10, shown removed from the housing unit.

EMBODIMENT OF FIGS. 10 AND 11

The valve assembly 300a, shown in FIGS. 10 and 11, is constructed similar to the valve assembly 300, shown in FIGS. 8 and 9.

The housing 334a includes a counterbore 420 in the aperture 346a, thereby providing a downwardly facing surface 422 encircling the aperture 346a. The counterbore 420 is sized to cooperate with a flange portion 424 formed on the lower end of the first valve stem 350a, adjacent the rectangular end 352 thereof. In the assembled position, as shown in FIG. 10, an upwardly facing surface 426 formed by the flange portion 424 engages the downwardly facing surfacing 422, thereby forming a secondary metal-to-metal seal between the first valve stem 350a and the housing 334a.

The valve body 360a is similar to the valve body 360, one difference being that the end face 428 of the valve body 360a is sized such that, in an assembled position, the end face 428 abuts the adjacent portion of the end face 320 of the flange 314, and the housing 334a does not include a rim similar to the rim 342 of the valve assembly 300 previously described. A counterbore 430 is formed in the end face 428, intersecting the bore 368 in the valve body 360a. The counterbore 430 is sized to receive and cooperate with the portion 406 of the composite seat 398.

The elongated slot 390a has a key portion 432 thereof, adjacent the end face 428 of the valve body 360a, which is of a smaller width than the remaining portion of the slot 390a. The key portion 432 is sized to matingly fit the smaller width of the rectangular end 352 of the first valve stem 350a. This type of construction permits a more accurate visual alignment of the second valve stem 384a prior to the insertion of the valve unit 312a into the housing unit 310a, and permits the valve unit 312a to be properly oriented with respect to the housing unit 310a prior to the insertion of the rectangular end 352 into the slot 388 of the second valve stem 384a.

The second valve stem 384a is oriented in the aperture 371 such that the slot 388 therein is aligned with the key portion 432, as shown in FIG. 11. The first valve stem 350a is oriented in the aperture 346a such that the rectangular end 352 thereof is aligned with the bore 340a in the housing 334a, that is, at a right angle to the orientation as shown in FIG. 10.

The valve unit 312a is then slid lengthwise into the housing unit 310a. The rectangular end 352 will first contact the key portion 432, and will be inserted and travel therein. Thus, the alignment of the first and the second valve stem 350a and 384a is assured prior to the contact of the interconnecting portions of the first and second valve stems 350a and 384a.

The second valve stem 384a also includes a flange portion 434 adjacent the uppermost end 384 thereof. The flange portion 434 forms a downwardly facing surface 436 which is sized and disposed to engage a portion of the valve body 360a to limit the movement of the second valve stem 384a in one direction.

OPERATION OF FIGS. 10 AND 11

The valve assembly 300a will operate similar to the valve assembly 300. One of the differences being that the valve body 360a is adapted such that it may be inserted into the housing 334a from either end, and the second valve stem 350a is constructed to include a flange portion 424 to provide a secondary metal-to-metal type seal.

One other salient difference between the valve assembly 300a and the valve assembly 300 is the key portion 432 which is formed in the slot 390a. The cooperation between the key portion 432 and the first and the second valve stems 350a and 384a assure a proper alignment, and thereby prevent damage to the interconnecting portions of the first and the second valve stems 350a and 384a due to a misalignment therebetween.

It is apparent from the foregoing that the valve assemblies described herein retain all of the advantages of an insertable type of valve unit, and yet have a contacting area between the valve assembly and the supporting flanges capable of pronding a secondary metal-to-metal seal therebetween, in the event the primary seals are destroyed.

Changes may be made in the construction and arrangement of the parts or elements of the various embodiments as disclosed herein without departing from the spirit and scope of the invention as defined in the following claims.

What I claim is:

1. A valve assembly for controlling the flow of fluid between a pair of aligned pipe flanges interconnected by a plurality of circumferentially spaced bolts, comprising:
    a housing unit, comprising:
        a housing having opposite end faces, a bore extending therethrough and being adapted to be supported between said flanges by said bolts, said housing being adapted such that each of the end faces thereof circumferentially contacts the end face one of the flanges, thereby providing a metal-to-metal seal therebetween; and
    a first valve stem having an upper and a lower end portion supported in the housing, the lower end portion extending a distance into the bore of the housing; and
    a valve unit supported in the housing unit, comprising:
        a valve body having opposite ends and an outer periphery, the outer periphery being sized for the body to be slid lengthwise into the bore of the housing, a portion of the valve body being relieved to accommodate the lower end portion of the first valve stem as the valve unit is slid lengthwise into the housing unit;
        a valve member supported in a portion of the bore in the valve body for opening and closing the valve assembly;
        a second valve stem supported in the valve body, having an upper and a lower end portion, the lower end portion being connected to the valve member and the upper end portion being adapted to interconnectingly fit the lower end portion of the first valve stem for transmitting the movement of the first valve stem to the valve member; and
        seat means in the valve body providing sealing and seating engagement between the valve body and the valve member when the valve member is moved to a closed position.

2. The valve assembly of claim 1 wherein the valve body is shaped to include an elongated recess therein intersecting one end thereof and a portion of the outer periphery thereof to accommodate the lower end portion of the first valve stem as the valve unit is slid lengthwise into the housing unit.

3. The valve assembly of claim 2 wherein the elongated recess is sized and disposed such that the upper end portion of the second valve stem, including the uppermost end thereof, is positioned in the elongated recess.

4. The valve assembly of claim 3 wherein a portion of the elongated recess is sized and disposed to journally engage a portion of the second valve stem.

5. The valve assembly of claim 2 wherein the elongated recess includes a key portion generally adjacent one end of the valve body, said key portion being sized to slidingly receive a portion of the first valve stem in one position of the first valve stem, said key portion thereby cooperating with the first valve stem to assure a proper orientation of the valve unit and the first valve stem upon insertion of the valve unit into the housing unit.

6. The valve assembly of claim 5 wherein the lowermost end portion of the first valve stem is rectangularly shaped; and wherein the uppermost end portion of the second valve stem includes a recess therein, said recess being shaped to interconnectingly receive the rectangularly shaped end portion of the first valve stem as the valve unit is slid lengthwise into the housing unit.

7. The valve assembly of claim 1 wherein the first valve stem is defined further to include a flange portion around an intermediate portion thereof, said flange portion forming an upwardly facing surface encircling the fist valve stem, sized and disposed to engage an adjacent portion of the housing, thereby providing a metal-to-metal seal therebetween.

8. The valve assembly of claim 1 defined further to include a third valve stem journaled in the valve body having an upper and a lower end portion, the upper end portion being connected to the valve member.

9. The valve assembly of claim 8 wherein the second valve stem is formed integrally with the valve member and extends radially therefrom; and wherein the third valve stem is formed integrally with the valve member and extends radially therefrom, said third valve stem being radially aligned with said second valve stem.

10. The valve assembly of claim 9 wherein the valve body is split in a horizontal plane extending through the centerline of the valve body.

11. The valve assembly of claim 1 wherein the valve member is further defined as being spherically shaped.

12. The valve assembly of claim 1 wherein the valve member is further defined as being disc shaped.

13. The valve assembly of claim 1 further defined to include an elastomeric liner bonded to a portion of the valve body defined by the bore through the valve body, said liner having a portion thereof sized and disposed to sealingly engage a portion of the second valve stem.

14. The valve assembly of claim 13 wherein the liner includes a portion sized and disposed to sealingly engage the end face of one of the flanges, and another portion sized and disposed to sealingly engage the end face of the opposite flange.

15. The valve assembly of claim 13 wherein the liner includes a portion sized and disposed to sealingly engage the valve member.

16. The valve assembly of claim 11 wherein the valve member is further defined to include a recess in a portion of the exterior surface thereof; and wherein the lower end portion of the second valve stem is defined further as being shaped to interconnecting fit in said recess, the lower end portion being sized smaller than said recess in one direction, so that the valve member will be free to float in an axial direction when the valve member is rotated to one position.

17. The valve assembly of claim 12 wherein the housing is further defined to include a rim formed adjacent one end thereof, said rim extending a distance radially into the bore of housing, thereby forming a wall encircling the bore in the housing; and wherein the valve body is defined further to include a recess formed in one end thereof adjacent the outer periphery thereof, the recess being sized and disposed to cooperate with said rim in the housing to positively locate the valve body in the housing in an axial direction.